June 13, 1933. A. J. MEYER 1,913,453
NUT LOCK
Filed Sept. 4, 1931
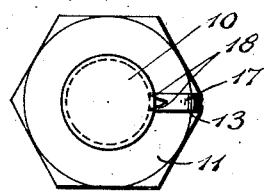
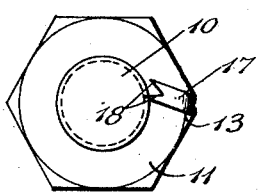
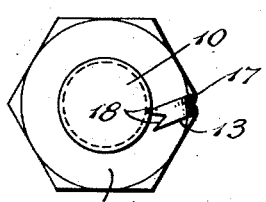
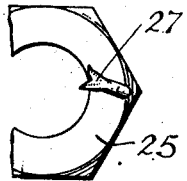
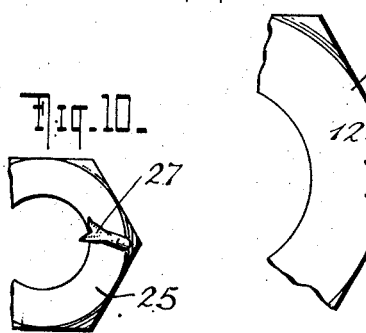
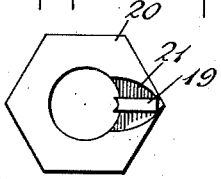
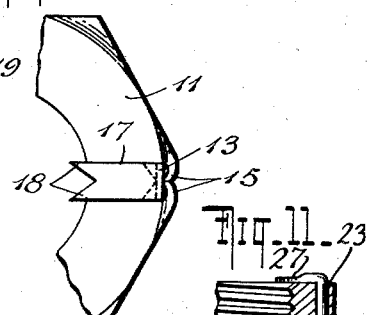
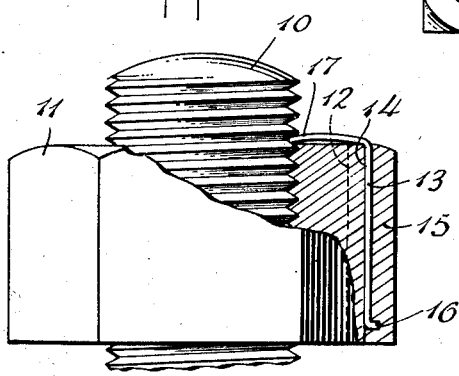
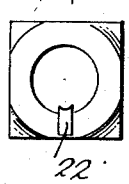
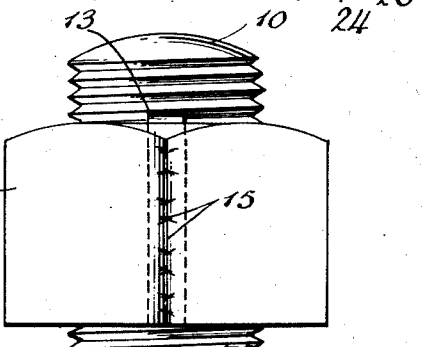
INVENTOR
ADOLPH J. MEYER
BY
ATTORNEYS Patented June 13, 1933

1,913,453

UNITED STATES PATENT OFFICE

ADOLPH J. MEYER, OF LEBANON, PENNSYLVANIA

NUT LOCK

Application filed September 4, 1931. Serial No. 561,163.

This invention relates to improvements in nut locks and has for one of its objects to provide a lock means of simple and practical construction which can be applied to standard types of nuts and bolts with a minimum of alteration thereto, and which will be capable of frictionally retaining a nut in position on a bolt.

Another object is to constitute the locking means in the form of a flat spring having a pair of locking projections and to rockingly support the same in a nut in such a manner that said projections can be engaged with the threads of a bolt to frictionally retain the nut thereon against turning movements in either direction.

Another object is to provide a locking element for a nut capable of assuming both radial and oblique positions relative to a bolt and frictionally holding said nut on the bolt in either of said positions.

The above and other objects will appear more clearly from the following detailed description, taken in connection with the accompanying drawing, which illustrates preferred embodiments of the inventive idea.

In the drawing—

Figure 1 is a plan view showing the position of the locking element before the nut is turned to thread the same upon a bolt, this position being also one in which the nut will be frictionally held in case of a slight reversal of its turning down movement.

Figure 2 is a similar view showing the friction-locking position the locking element assumes during and upon completion of the turning down movement of the nut;

Figure 3 shows the locking element in the release position after sufficient turning pressure in a reverse direction has been applied to the nut to overcome the frictional locking effect of said element, and also illustrates the locking position for a bolt having left-hand threads;

Figure 4 is a fragmentary plan view of the nut before the locking element is mounted therein;

Figure 5 is a similar view showing the locking element in place;

Figure 6 is a side elevation, partly in section, of a nut and bolt with the locking means in position;

Figure 7 is a side elevation taken at right angles to the plane of Figure 6;

Figure 8 is a bottom plan view of a slightly different form of nut and locking element;

Figure 9 is a top plan view showing a still different form;

Figure 10 is a similar view of still another form of the invention; and

Figure 11 is a fragmentary vertical section of the form shown in Figure 10.

Referring more particularly to Figures 1 to 7, the numeral 10 indicates a bolt of ordinary construction which may have either a right or left-hand thread and which, in accordance with the present invention, requires no alteration, such as the formation of slots, to effect the locking of a nut thereon. The nut 11 shown in said figures is of hexagonal formation, although other shapes may be employed without departing from the spirit or scope of the invention. The nut is provided, preferably along the meeting edge of two adjacent sides thereof and parallel to the axis of the nut, with a groove 12 for the reception of the shank of a locking element 13 which, in the present instance, is formed of a flat strip of resilient metal of a width substantially that of the groove 12. The bottom of said groove is formed by two diagonally disposed surfaces which converge to provide a supporting edge 14 that engages the shank of the element 13 medially of its longitudinal edges so as to constitute a fulcrum about which said element will have a slight rocking movement. After the element 13 has been positioned in the groove, the outer edges 15 of the latter are bent over, as shown in Figure 5, in any suitable manner to secure said element in the groove. If desired, the inner end of the shank may have a projection 16 (Figure 6) which will embed itself to some extent in the bent over edges 15 and thus form an anchor for the element 13 which will prevent longitudinal movement thereof relative to the groove.

The locking end 17 extends laterally from the shank and along the upper surface of the nut and is bifurcated at its free end to form a pair of prongs 18 which extend inwardly of the edge of the nut opening so as to engage and bite in the threads of the bolt 10.

Normally, that is before the nut is threaded upon the bolt, the locking end 17 can be in either of the positions shown in Figures 1 or 2, in the former of which it extends radially to the axis of the nut. If in the position of Figure 1, when the nut is threaded on to the bolt in a clockwise direction as viewed in Figure 2, the engagement of the prongs 18 with the thread of the bolt will cause the locking element 13 to rock about the edge 14 as a fulcrum to the oblique position of Figure 2, with only one of said prongs engaging the thread of the bolt. When rocking about said fulcrum there is a slight torsional twist imparted to the shank of the element 13 if the inner end thereof is anchored as in Figure 6, but this twist has no appreciable effect upon the action of the element. The end 17 remains in the position above described until the nut has been turned as far as required and should there be any tendency of the nut to turn in the opposite direction, due to vibration or other causes, the prong engaged with the bolt will bite into the same sufficiently to produce enough friction to prevent the nut from so turning. However, the locking action of the element is not of such strength as to prevent the nut from being turned off the bolt when a wrench is utilized to accomplish the rotation of the nut. In such instance, the resiliency of the element 13, and particularly its end 17, allows it to rock in the reverse direction from that above described and shown in Figure 2 so that it will pass into and then beyond its radial position and assume the position of Figure 3 wherein the nut is free to be turned off the bolt.

It may be desirable, at times, after the nut has been turned down on the bolt to a desired position thereon, to impart to the nut a slight movement in the reverse direction to cause the element 13 to rock to the position of Figure 1, whereupon both prongs 18 will engage in the threads of the bolt and cooperate to frictionally maintain the nut against turning movements in either direction. It will be further understood that, in case the nut and bolt have left-hand threads, the locking position of the element 13 will be as shown in Figure 3.

In Figure 8, the locking element 19, of slightly different form than the element 13, is shown applied to the bottom of a hexagonal nut 20 provided with a recess 21 for the reception of the locking end of the element 19, thereby preventing contact of the latter with a surface against which the bottom of the nut might be engaged.

When it is desired to employ the locking element on a square nut, it is preferable, as shown in Figure 9, to mount the locking element 22 in a side of the nut rather than in a corner thereof so as to shorten the length of the locking end of said element and thereby make it more rigid than would be the case if said end extended inwardly from a corner.

As shown in Figures 10 and 11, the locking element 23 may be made round, instead of flat as in the other embodiments, and, after insertion of the shank thereof into the opening 24 of the nut 25, the latter is crimped, as indicated at 26, to secure said shank against turning. The locking end 27 is flattened and bifurcated in the same manner as previously described and flexes relative to said shank when engaged with the threads of a bolt upon which the nut 25 is threaded so as to prevent turning of said nut in one direction.

What is claimed is:

1. A device of the character described, comprising a nut having a groove parallel to the axis thereof, the bottom of which is provided with a supporting edge, and a locking element formed of a flat strip and bent to provide a shank and a locking end, said shank being rockingly engaged with said edge to permit said locking end to assume radial and oblique positions relative to the axis of the nut, and said locking end having its extremity bifurcated to form a pair of prongs both of which are engageable with the thread of a bolt when said end is in its radial position and one of which is engageable with said thread when said end is in an oblique position.

2. A device of the character described, comprising a nut having a groove parallel to the axis thereof, the bottom of which is provided with a supporting edge, and a locking element formed of a flat strip and bent to provide a shank and a locking end, said shank being rockingly engaged with said edge to permit said locking end to assume radial and oblique positions relative to the axis of the nut, and said locking end having its extremity bifurcated to form a pair of prongs both of which are engageable with the thread of a bolt when said end is in its radial position and one of which is engageable with said thread when said end is in an oblique position, said shank having a projection at its inner end adapted to be embedded in the nut to anchor the locking element against longitudinal movement in said groove.

3. A device of the character described, comprising a nut having a groove parallel to the axis thereof, the bottom of which is provided with a supporting edge, and a locking element formed of a flat strip and bent to provide a shank and a locking end, said shank being rockingly engaged with said edge to permit said locking end to assume radial and oblique positions relative to the axis of the nut, and being provided with means engageable with the nut to prevent longitudinal movement of the locking element relative to said groove, and said locking end having its extremity bifurcated to form a pair of prongs both of which are engageable with the thread of a bolt when said end is in its radial position and one of which is engageable with said thread when said end is in an oblique position.

4. A device of the character described, comprising a nut having a groove parallel to the axis thereof, the bottom of which is provided with a supporting edge, and a locking element having a shank rockingly supported on said edge and also having a locking end engageable with the thread of a bolt when said shank has been rocked about said edge as a fulcrum, the sides of said groove being bent inwardly against said shank to retain the same in position in said groove.

5. A device of the character described, comprising a nut having a groove provided therein with a supporting edge, and a locking element having a flat shank engageable with said edge intermediate the longitudinal edges of said shank for rockingly supporting the shank in said groove, said element also having a locking end engageable with the thread of a bolt when said element has been rocked about said edge as a fulcrum.

6. A device of the character described, comprising a nut having a groove provided therein with a supporting edge, and a locking element having a flat shank and a locking end, said shank being rockingly engaged with said edge to permit said locking end to assume different positions relative to the axis of the nut, and said locking end having a bifurcated extremity forming prongs both of which are engageable with the thread of a bolt when said end is in one of said positions, and one of said prongs being engageable with said thread when said end is in another of its positions.

7. A device of the character described, comprising a nut having a groove provided therein with a supporting edge, and a locking element having a flat shank and a locking end, said shank having its extremity remote from said locking end anchored in the nut, and the remainder of the shank being rockingly engaged with said edge to permit said locking end to assume different positions relative to the axis of the nut, and said locking end having a bifurcated extremity forming prongs both of which are engageable with the thread of a bolt when said end is in one of said positions, and one of said prongs being engageable with said thread when said end is in another of its positions.

In testimony whereof, I have affixed my signature.

ADOLPH J. MEYER.